(12) United States Patent
Thompson

(10) Patent No.: US 6,283,410 B1
(45) Date of Patent: Sep. 4, 2001

(54) SECONDARY POWER INTEGRATED CABIN ENERGY SYSTEM FOR A PRESSURIZED AIRCRAFT

(75) Inventor: Robert George Thompson, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 0 days.

(21) Appl. No.: 09/434,054

(22) Filed: Nov. 4, 1999

(51) Int. Cl.[7] .................................................. B64D 27/00
(52) U.S. Cl. ............................................... 244/59; 454/71
(58) Field of Search ............................... 244/59; 454/71, 454/72, 70, 238; 165/235, 234; 128/200.24

(56) References Cited

U.S. PATENT DOCUMENTS

| | | | |
|---|---|---|---|
| 4,091,613 | * 5/1978 | Young | 60/39.07 |
| 4,261,416 | 4/1981 | Hamamoto | 165/23 |
| 4,419,926 | 12/1983 | Cronin et al. | 98/1.5 |
| 4,494,372 | 1/1985 | Cronin | 60/39.07 |
| 4,684,081 | 8/1987 | Cronin | 244/58 |
| 4,706,908 | 11/1987 | Huffman et al. | 244/118.5 |
| 5,137,230 | 8/1992 | Coffinberry | 244/118.5 |
| 5,299,763 | 4/1994 | Bescoby et al. | 244/118.5 |
| 5,442,905 | 8/1995 | Claeys et al. | 244/118.5 |
| 5,490,645 | 2/1996 | Woodhouse | 244/118.5 |
| 5,709,103 | 1/1998 | Williams | 244/118.5 |
| 5,791,982 | 8/1998 | Curry et al. | 454/74 |
| 5,813,630 | 9/1998 | Williams | 244/118.5 |
| 5,956,960 | * 9/1999 | Niggeman | 62/172 |

OTHER PUBLICATIONS

Integrated Power Systems for Future Transport Aircraft (1997) by Kenneth R. Williams.
T/EMM/Engine Integration.
Integrated Power Package In–Flight Mode, Fan Make–Up.

* cited by examiner

*Primary Examiner*—Charles T. Jordan
*Assistant Examiner*—George L. Steele
(74) *Attorney, Agent, or Firm*—Wood, Phillips, VanSanten, Clark & Mortimer

(57) ABSTRACT

Increased efficiency of operation in pressurized aircraft may be obtained by employing pressurized air to be discharged from an aircraft cabin 10 as combustion air by applying it to the inlet 42 of a cycle compressor 40 whereat it is compressed before being fed to a combustor 52. Fuel from a source 64 is combusted within the combustor 52 and drives a high pressure turbine 48 as well as a low pressure turbine 30, either one of which may drive a load 56, 58 to provide electrical power for the aircraft. In addition, a load compressor 20 provides air to an environmental control system including an ECS turbo machine 88 and a bypass 110 for delivering conditioned air to the cabin 10.

17 Claims, 1 Drawing Sheet

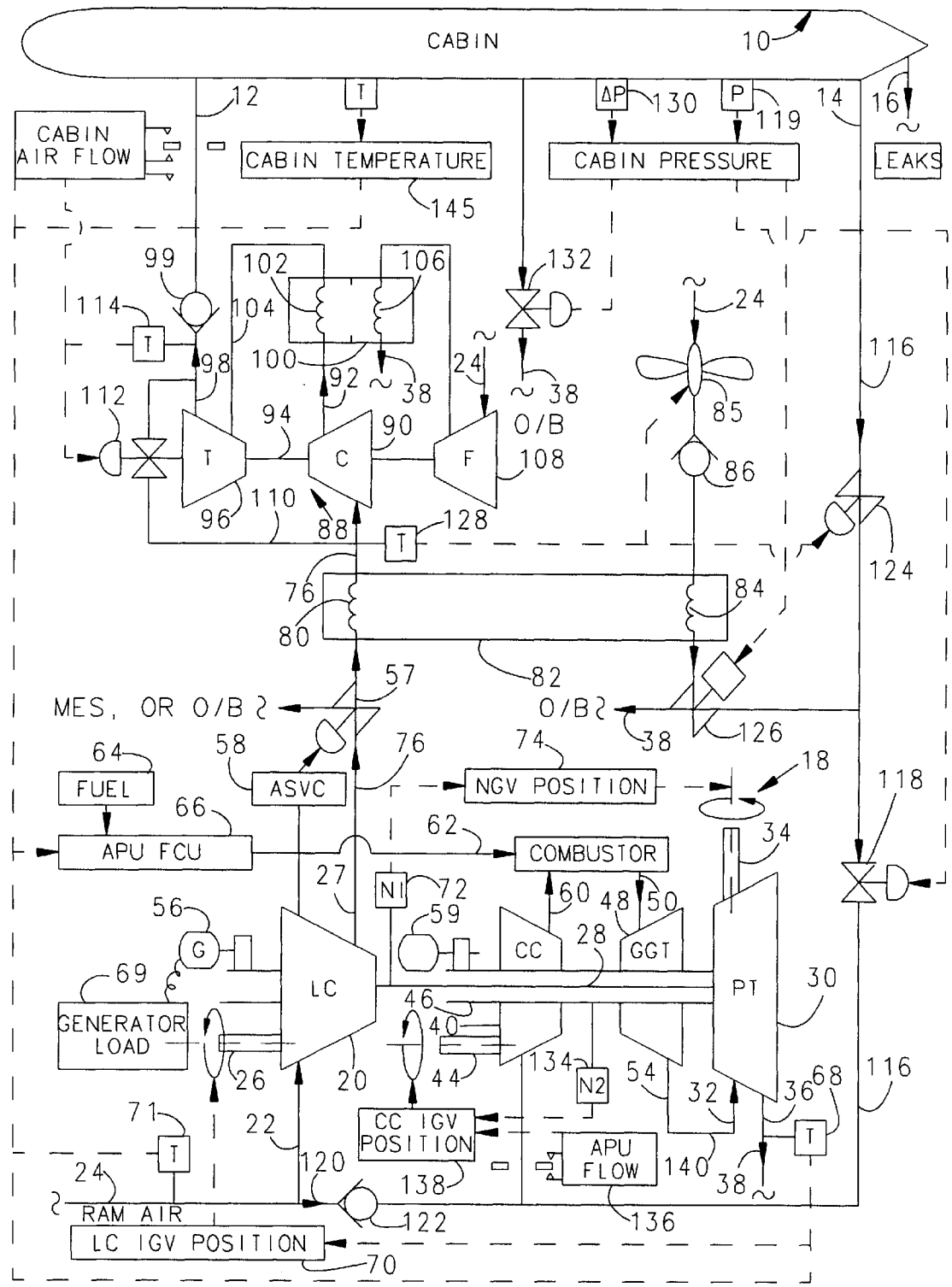

SECONDARY POWER INTEGRATED CABIN ENERGY SYSTEM FOR A PRESSURIZED AIRCRAFT

FIELD OF THE INVENTION

This invention relates to a secondary power system for pressurized aircraft.

BACKGROUND OF THE INVENTION

Aircraft operating at altitudes above approximately 10,000 ft. are conventionally pressurized to avoid any need for supplemental oxygen for crew and passengers. Typically, the cabin pressure is maintained constant at about the atmospheric pressure typically found at an altitude of 10,000 ft. Moreover, the cabin air must be changed constantly, typically at the rate of 1 lb. per minute per passenger and crew member for passenger and crew comfort and well-being.

In the usual case, the air for pressurizing the cabin is drawn as bleed air from the main propulsion engines of the aircraft. It is then conditioned for temperature and humidity and distributed within the cabin. Ultimately, the air is discarded overboard through a cabin pressure vent/control valve.

The bleed air for cabin pressurization drawn from the main engines increases the fuel consumption of the main engines. The increased fuel burn is not insubstantial and as a consequence, poses constraints on aircraft range, particularly for large aircraft cruising at high altitudes for long periods of time and increases operating costs.

The current practice of discarding cabin air overboard from cabin pressure to ambient static pressure in such a way as to contribute to the thrust of the main engines is simple. However, it is an inefficient way to recover the energy in the cabin airstream. Needless to say, an improvement in energy recovery from cabin air provides an opportunity for fuel cost savings and/or an extension of aircraft range. Moreover, the ducting required to convey bleed air from the main engines not only adds weight to the airframe, but contributes somewhat to the complexity thereof and accordingly, to the capital cost of the aircraft. If such ducting can be eliminated, lower capital costs and lower fuel costs can be obtained. At the same time, it remains necessary to provide for cabin pressurization and cabin air change. To obtain the efficiencies of lesser capital costs and lower fuel costs, a more efficient system of cabin pressurization is highly desirable.

SUMMARY OF THE INVENTION

It is the principal object of the invention to provide a new and improved secondary power system for pressurized aircraft. More specifically, it is an object of the invention to provide such a system that makes more efficient use of cabin air to be discarded. It is also an object of the invention to provide such a system with the capabilities conventionally associated with an auxiliary power unit and to integrate such a system with an auxiliary power unit.

One exemplary and preferred embodiment of the invention envisions a turbo machine including a rotary compressor connected by a shaft to a rotary turbine wheel and a combustor connected to an outlet of the compressor, connected to a source of fuel to be combusted to provide gases of combustion, and connected to an inlet to the turbine wheel so that the gases of combustion may drive the turbine wheel to, in turn, drive the compressor. An inlet is provided to the compressor and ducting is adapted to be connected to an aircraft cabin and to the compressor inlet to provide air from the cabin to the compressor to be compressed thereby and delivered to the combustor to combust fuel therein. A load to be driven is connected to the turbo machine and a source of air under pressure is adapted to be connected to an aircraft cabin.

As a consequence of the foregoing, pressurized cabin air to be discarded is utilized to support combustion for the secondary power source. The cabin air, when the aircraft is cruising at altitude, will be at a higher pressure than the ambient so less work is required to raise the combustion air to the required pressure required to run the turbo machine. As a consequence, the requirement for less work lowers the quantity of fuel required to operate the secondary system.

In a preferred embodiment, the source of air under pressure is a turbo machine. In one embodiment, the source of air under pressure is the turbo machine forming part of the secondary system.

More specifically, the invention, in a highly preferred embodiment, contemplates that the source of air under pressure include a second rotary compressor coupled by a second shaft to a second rotary turbine wheel.

In an even more preferred embodiment, the second compressor, the second shaft and the second turbine wheel form part of the first mentioned turbo machine and the shafts are coaxial.

A preferred embodiment of the invention also contemplates the providing of an aircraft cabin. A low pressure rotary turbo machine is provided and includes a rotary load compressor connected by a first shaft to a rotary, low pressure turbine wheel. Also included is a high pressure rotary turbo machine which includes a rotary cycle compressor connected by a second shaft to a rotary high pressure turbine wheel.

A combustor such as mentioned previously is connected to an outlet of the cycle compressor and to a source of fuel for combusting the fuel as mentioned previously. The combustor directs the combustion gases to the high pressure turbine wheel to cause rotation of the same.

An ambient air inlet is provided for the load compressor and first ducting connects an outlet of the load compressor to the cabin to provide compressed air to pressurize the cabin. Second ducting connects the cabin to an inlet of the cycle compressor and third ducting connects an outlet of the high pressure turbine wheel to an inlet for the low pressure turbine wheel.

Again, the shafts may be coaxial. In a highly preferred embodiment, the first shaft is rotatable within the second shaft.

In one embodiment, at least one heat exchanger is provided in the first ducting and includes a coolant flow path in exchange relation with the first ducting.

In this embodiment of the invention, the coolant flow path preferably includes an inlet connected to receive ambient air.

Alternatively, the coolant flow path includes an inlet connected to the cabin to receive cabin air.

A highly preferred embodiment of the invention calls for the first ducting to include an environmental control system (ECS) rotary turbo machine which includes an ECS rotary compressor connected to an ECS turbine wheel. The one heat exchanger is located in the first ducting between the load compressor outlet and the ECS turbo machine and is connected to an inlet of the ECS compressor. Also included is a further heat exchanger that has a first flow path interconnecting an outlet of the ECS compressor to an inlet of the ECS turbine wheel. The first ducting further interconnects an outlet of the ECS turbine wheel to the cabin and the further heat exchanger also includes a second flow path for coolant which is in heat exchange relation with its first flow path.

According to a preferred embodiment of the invention as discussed immediately preceding, the second flow path has an inlet connected to receive ambient air. Alternatively, the second flow path has an inlet connected to the cabin to receive cabin air.

As mentioned previously, a load to be driven is connected to the turbine machine, and specifically, to the first shaft thereof.

One embodiment of the invention alternatively includes an ambient air inlet for the cycle compressor. A check valve may be located in the inlet to the cycle compressor so that the same may receive ambient air when the ambient air pressure is higher than that of the cabin air.

In a preferred embodiment of the invention, an inlet to the cycle compressor includes an inlet area varying device at the point of connection of the cycle compressor in the second ducting. In a highly preferred embodiment, the inlet air varying device comprises variable inlet guide vanes.

Other objects and advantages will become apparent from the following specification taken in connection with the accompanying drawings.

DESCRIPTION OF THE DRAWING

The FIG. is a schematic of a secondary power integrated cabin energy system made according to a highly preferred embodiment of the invention.

DESCRIPTION OF THE PREFERRED EMBODIMENT

The disclosure that follows describes an aircraft cabin secondary power unit integrated with an environmental control system (ECS) that provides cabin air meeting the various criteria for flow rate, temperature and pressure at all conditions of ground operation, cabin cool down, passenger loading, take-off, climb, cruise, descent, landing, taxiing and passenger unloading. According to the invention, the cabin air source is removed from the main engines and placed on the secondary power unit as will be described in greater detail hereinafter. Referring now to the drawing, a pressurized aircraft cabin is shown schematically and generally designated 10. The same includes a conditioned air inlet 12 and an exhaust air outlet 14 An arrow 16 indicates leakage air that escapes from the cabin 10 around door gaskets, control cable access holes, etc.

The system also includes a turbo machine, generally designated 18. The turbo machine 18 includes a rotary load compressor 20 having an inlet 22 connected to a source of ambient air, typically ram air, as indicated at 24. The load compressor 20 at the inlet 22 is provided with conventional variable inlet guide vanes 26 which may be opened, closed, or positioned in between two extremes of movement for conventional purposes. Those skilled in the art will appreciate that when the inlet guide vanes 26 are closed, the work required by the compressor 20 to compress air will be reduced substantially because of the reduced inflow of air to the compressor 20. The compressor 20 also includes an outlet 27.

A shaft 28 couples the load compressor 20 to a low pressure power turbine 30. The low pressure turbine 30, and its inlet 32, is provided with conventional variable nozzle guide vanes shown schematically at 34 and of conventional construction. The low pressure turbine also includes an outlet 36 which discharges overboard as indicated at 38.

The turbo machine 18 also includes a cycle compressor 40 also provided with an inlet 42 having conventional variable inlet guide vanes 44. The cycle compressor 40 is connected via a shaft 46 concentric with the shaft 28 to a high pressure turbine 48. The high pressure turbine 48 includes an inlet 50 connected to a combustor 52 as well as an outlet 54 connected to the inlet 32 of the low pressure turbine wheel 30.

In the embodiment illustrated, the shaft 28 rotates within the shaft 46. However, it is not necessary that such an arrangement be employed. It is also possible that shafts 28 and 46 be only coaxial and not one journaled within the other. Alternatively, two separate turbo machines, each having a compressor and a turbine linked by a shaft may be utilized. However, such an arrangement may require more ducting than that schematically illustrated in the drawing.

A load 56, such as a generator, may be connector to the shaft 28 to be driven thereby if the call for electrical power by the aircraft requires it. For example, electrical power from the load 56 may be used for starting the main propulsion engines and/or for other aircraft electrical loads. (Alternatively, if the main propulsion engines have air starters, a diverter valve 57 may be manipulated by an air starter valve control 58 to direct compressed air from the compressor outlet 27 to the engines for starting purposes.) Similarly, a starter generator 59, may be connected to the shaft 46. The starter generator 59 may be employed as a starter to cause rotation of the shaft 46 and initiate a power cycle by providing compressed air to the combustor 52 to be combined with fuel to drive the turbine wheel 48. The starter generator 59 may also be utilized, if desired, as a generator to provide electrical power to the aircraft when the turbo machine defined by the cycle compressor 40 and the high pressure turbine 48 is operating.

To provide air to support combustion to the combustor 52, the cycle compressor 40 includes an outlet 60 connected to the combustor 52. Also provided to the combustor 52 is a connection 62 to a source of fuel 64. Fuel flow may be controlled by a conventional fuel control unit (FCU) 66. The fuel control unit is nominally responsive to cabin air flow demand, subject to maximum allowable temperature at the low pressure turbine exhaust 38. To protect the hot section components (the combustor 52, the gas generator turbine (GGT) 48, and the power turbine (PT) 30), the cabin air flow can be limited by maximum allowable turbine exhaust gas temperature (EGT), sensor 68.

The EGT sensor 68 is responsive to a generator load 69, also. The generator load conventionally has precedence over the cabin air flow load. In the limiting cases the cabin air flow can be increased by off-loading the generator 56. Individual generator loads 69 can be switched on and off from the cabin by switch gear (not shown), giving the crew some discretion as to electric power load versus cabin cooling load. The EGT sensor 68 is also employed with conventional controls to limit the fuel flow if the exhaust gas temperature rises above the safe limit. A load compressor inlet guide vane position sensor/controller 70 moves the inlet guide vane assembly 26 for the load compressor 20 to a desired angular setting to limit air flow from the load compressor outlet 27 to the cabin 10.

Desirably, the ram air inlet 24 is provided with a temperature sensor 71 which senses the temperature of incoming ram air. The signal generated is used to somewhat elevate the permissible exhaust gas temperature limit for warmer than normal ambient conditions, thus reducing the quantity of fuel burned in the combustor 52. Consequently, under such conditions a fuel savings may be realized.

The generator 56 can be run at nearly constant speed or variable speed, driven by the low pressure spool 28 shaft speed, referred to herein as "N1". The low pressure spool speed sensor 72 controls a nozzle guide vane position sensor/controller 74 for the power turbine 30. If N1 is lower than its set point minimum speed, then the nozzle guide vane assembly 34 is closed to maintain the minimum set point N1 shaft speed. Conversely, if N1 is faster than the set point maximum speed, then the nozzle guide vane assembly 34 is opened to maintain maximum set point N1 shaft speed. Consequently, as ambient temperature conditions are increased, the turbine inlet temperatures utilized are limited to their maximum values by controlling supply of fuel from the source 64.

The outlet 27 from the load compressor is connected by first ducting 76 to the diverter valve 57 and to a flow path 80 within a heat exchanger 82 which serves as a precooler for air delivered to the aircraft environmental control system. Alternatively, the diverter valve can be positioned to send some compressed air overboard for load compressor anti surge control, or as still another alternative, positioned to deliver all the compressed air to start the main engines, as mentioned previously. The flow path 80 is in heat exchange relation with a flow path 84 which receives ram air from the ram air inlet 24 and discharges it to the overboard discharge 38, during ground operations, and in flight at lower altitudes. The ram air is flowed through an electric fan 85 through a check valve 86 before being passed to the flow path 84. In the absence of ram air, the fan 85 may be energized to provide air flow. The flow path 80 is connected to the inlet 87 of a turbo machine, generally designated 88, which is an environmental control system turbo machine. As a consequence, the same has an ECS rotary compressor 90 which receives air via the inlet 87 to discharge it via an outlet 92. The ECS compressor 90 is connected by a shaft 94 to an ECS turbine wheel 96. The turbine wheel 96 has an outlet 98 which is connected to a check valve 99 and to the inlet 12 for the cabin 10.

An ECS main cooler heat exchanger 100 includes a flow path 102 connected to the outlet 92 for the ECS compressor 90 and to an inlet 104 for the ECS turbine 96. Also within the ECS main cooler 100 is a second flow path 106 which is connected to a fan 108 in fluid communication with the ram air inlet 24. The second flow path 106 discharges to the overboard discharge 38. The fan 108 is driven by the shaft 94. As a consequence, air flowing in the flow path 102 after exiting the compressor 90 is cooled within the cooler 100. The same is further cooled upon expansion within the ECS turbine 96 before it is directed to the cabin 10.

The first ducting 76 includes a bypass, generally designated 110, that includes a control valve 112 which in turn is controlled by a sensor 114 at the cabin inlet 12. The sensor 114 determines the temperature of the air delivered to the cabin inlet 12 and to the extent required to attain a desired temperature, bypasses compressed, relatively warm air exiting the heat exchanger outlet 76 to mix with and warm the cooler air emerging from the outlet 98 of the turbine 96. As a consequence, the proper mix of relatively warm air from the bypass 110 and relatively cool air from the outlet 98 of the ECS turbine 96 to achieve the desired cabin temperature is provided.

Second duct work, generally designated 116, connects the cabin outlet 14 with the inlet 42 for the cycle compressor 40 via a control valve 118. The control valve 118 is connected to a sensor 119 which monitors cabin absolute pressure and controls the flow rate of exhaust air from the cabin outlet 14 to maintain the desired cabin pressure, when cruising at higher altitudes.

As a result of this connection, pressurized cabin exhaust air is provided to the inlet 42 of the cycle compressor 40 to be compressed and fed to the combustor 52 to support the combustion of fuel from the source 64 therein. Because in cruise conditions at high altitude, the cabin pressure will be significantly greater than the ambient pressure, the cycle compressor 40 does not require as much energy to elevate the combustion inlet air to a pressure sufficient to maintain proper combustion of fuel within the combustor 52 prior to delivery of hot gas to the high pressure turbine 48. A larger than usual pressure ratio is then available to the power turbine 30, at lower than usual inlet temperature. As a consequence, less work is required of the cycle compressor 40 than in conventional systems, with a resultant fuel saving.

For ground operations and conditions other than cruise the system includes a duct 120 extending from the rain air inlet 24 through a check valve 122 to the cycle compressor inlet 42. As a consequence of this construction, if the ram air pressure is greater than that of the air in the cabin 10 being delivered to the inlet 42, ram air 24 will be fed to the cycle compressor 40, for normal typical auxiliary power unit type operation.

It is to be noted that as an alternative to providing ram air to the flow path 84 of the heat exchanger 82, some or all cabin air may be used instead. To this end, the duct 116 includes a valve 124 operable to divert exhausted cabin air to the flow path 84. An additional valve 126 is operable to either return the exhaust cabin air to the duct 116 or to the overboard dump 38. Specifically, the valve 126 is an on/off diverter valve that either passes ram air overboard 38, or delivers cabin air to a conduit 128 connected to the duct 116. The valve 124 is a control diverter valve that allows preheating of the air delivered to the cycle compressor 40 and combustor 52 in the beat exchanger 82, thereby further lowering the needed fuel rate for the secondary power unit. The valve 124 is controlled by the cabin temperature by conventional sensing means 128 during cruise. By not using ram air 24 flowed through the fan 85 to the overboard vent 38 via the diverter valve 126, the amount of ram air taken on board is reduced, lowering the aircraft drag. Consequently, the fuel consumption of the main propulsion engines is further reduced.

In some instances, cabin air flow in the duct 116 may be directed in varying quantities to the flow path 106 of the heat exchanger 100 directly or via the fan 108, thereby reducing or eliminating the flow of ram air to the fan 108. As ram air consumption is a source of drag on the aircraft, this reduction or elimination reduces the fuel consumption of the main engines to produce a fuel savings. The diverted cabin air may be dumped overboard or returned to the duct 116.

Cruise operation is generally as follows. Cabin air exiting the outlet 14 will be provided to the cycle compressor 40 during conditions when the cabin pressure significantly exceeds the ambient static pressure. Typically, this will occur during climb, cruise, and descent significantly above an altitude of about 10,000 ft. as well as on the ground if the cabin doors are open.

For ground operations during cool down of the cabin on very hot days, the cabin doors may be closed, the cabin slightly pressurized, and the cabin air returned via the control valve 118 to the cycle compressor 40, to lower the turbine inlet temperatures for the turbines 30, 48, extending the life of the secondary power unit hot end components. Ground operations will require the heat exchanger flow path 84 to be fed by outside air via the fan 131, check valve 130, valve 126 to overboard 38. The valve 124 will be closed to check valve 86/flow path 84 interface and open to the valve 118.

During normal ground operations, the pressure at the cabin is also atmospheric. The check valve 122 will open to provide ambient air to the cycle compressor 40 from the rain air source 24. In other words, the cycle compressor 40 will draw air from the higher pressure source, be it the cabin 10 or the ram air source 24. In some cases, a mix of air from both sources will occur if they are at near equal pressures.

In flight during climb, ambient pressure will decrease with increasing altitude. The cabin pressure will follow the ambient pressure through the operation of a conventional "DeltaP" control 130, up to about 10,000 ft. altitude. Under "DeltaP" control the expended cabin air is released overboard through a cabin pressure control valve 132. Starting at some altitude above 10,000 ft. the cabin will be maintained at constant pressure, about 10.1 psia, by operation of the absolute pressure control sensor 119 acting through the control valve 118 delivering air to the cycle compressor inlet 42. During this transition phase, the diverter control valve 124 delivers all air through the duct 116, and is closed to the heat exchanger flow path 84. Ram air is flowed to the heat exchanger flow path 84 instead. Throughout, the secondary power unit system ram pressure will be somewhat greater than the ambient static pressure, depending on flight Mach number and the secondary power unit inlet recovery coefficient. Ultimately, the falling ambient pressure causes the check valve 122 to close and all of the air to the cycle compressor inlet 42 will then come from the cabin 10. Cabin pressure control is by the control valve 118, sized for a modest pressure drop as cabin air travels to the cycle compressor 40. Airflow through the cycle compressor 40 is entirely that provided to the cabin 10 via the cabin inlet 12, less the air that is leaked overboard from the cabin at 16.

Transition to cruise is accompanied by replacing the ram air 24 from the fan 131 with cabin air. The valve 124 is moved to deliver some air to the check valve 86/flow path 84 interface, closing the check valve 86. The diverter valve 126 is concurrently opened to return the cabin air to the duct 116 downstream of the valve 124. The valve 124 is modulated to maintain air from the flow path 80 at a desired temperature by the sensor 128 during cruise. In this configuration the aircraft has minimum drag and maximum cabin energy recovery applied to minimize fuel consumption.

The cycle compressor 40 is required to run between the limits of choke and surge with a widely varying inlet volumetric flow. On the ground the inlet, volumetric flow at the inlet 42 is large, falling continuously to very much lower volumetric flow at cruise. The cycle compressor 40 is kept stable, within choke flow limits by lowering the gas generator (high pressure) spool shaft 46 speed (N2) at cruise, and simultaneously closing the inlet guide vane assembly 44. N2 is sensed by a speed sensor 134 and that data is combined with data from a secondary power unit inlet air flow sensor 136 data at a cycle compressor inlet guide vane position sensor/controller 138 to properly position the inlet guide vanes 44 for the cycle compressor 40.

The cycle compressor 40 delivers the cabin air to the combustor 52 where fuel is burned to add sufficient energy to drive both the high pressure turbine wheel 46 and the low pressure turbine wheel 30. Specifically, the gas products of combustion are first expanded in the high pressure turbine 48 to provide rotation of the cycle compressor 40. The products of combustion exiting the high pressure turbine 48 are then fed via third ducting 140 interconnecting the outlet 54 of the high pressure turbine 48 and the inlet 32 for the low pressure turbine wheel 30. After being expanded in the low pressure turbine 30 to drive the load compressor 20 as well as any load 56 connected to the shaft 28, the products of combustion are dumped overboard.

In general, it is preferred that mechanisms such as the load 56 and the starter generator 59 be located on the low temperature ends of the respective shafts 28, 46, that is, adjacent the compressors 20 and 40.

As noted earlier, the system employs variable inlet guide vanes 26, 44, for the compressors 20,40, respectively, as well as variable nozzle guide vanes 34 at the low pressure turbine 30. Closing the load compressor guide vanes 26 lowers the flow and power demand of the load compressor 20, leaving the shaft 28 available to drive the electric generator 56 to provide power for an electric main engine starter, or any other function requiring electrical power. Closing the inlet guide vanes assembly 44 for the cycle compressor 40 has the effect of allowing the cycle compressor 40 to pass a lesser volumetric flow rate with good efficiency and good stability when at high altitude cruise and during similar conditions that may occur during climb and descent. In general, the inlet guide vanes 44 are maintained in near full open position during all operations on the ground and are progressively closed, and the secondary power unit turbine inlet temperature lowered, with the resulting slowing of the speed (N2) of the shaft 46 as the aircraft climbs in altitude and flight velocity increases.

The variable nozzle guide vanes 34 are necessary to control the pressure ratio split between the high pressure turbine 48 and the low pressure turbine 30. In operations on the ground, the variable nozzle guide vanes 34 are maintained at or near full open and both the shafts 28 and 46 are driven at near maximum speeds.

As the aircraft ascends to a higher altitude, and moves at a higher velocity, the variable nozzle guide vanes 34 are progressively closed. The resulting inter turbine pressure between the turbine wheels 48 and 30 lowers both of the pressure ratios for the turbine 48 and shaft 46 speed at low turbine inlet temperatures to match the reduced power demand by the unloaded and slowed cycle compressor 40. As a consequence, the high pressure spool defined by the cycle compressor 40, the shaft 46 and the turbine wheel 48 is then progressively turbo charged by the load compressor 20 through the cabin air supply system to provide a relatively modest pressure ratio that is required of the cycle compressor 40 while passing a low volumetric flow. These conditions are satisfied by operating the high pressure shaft 46 at a relatively slow speed with the variable inlet guide vanes 44 for the cycle compressor 40 in a partially closed position.

Closing the variable nozzle guide vanes 34 increases the pressure ratio across the low pressure turbine 30, shifting the available power to drive the load compressor 20 with sufficient shaft speed to meet cabin pressure, air flow rate and electric power requirements.

Preferably, the speed of the two shafts 28 and 46 are treated as dependent variables. The shaft 28 will be driven to match cabin air pressure and air flow rate at cabin air temperatures. Alternatively, the shaft 28 may be run at nearly constant speed to provide constant frequency generator electric power output. Volumetric flow into the cycle compressor 40 will typically be nearly constant at cruise at high altitude. The shaft 46 will be driven at a sufficient speed to pass the mass of cabin air flowing through the ducting 116 through the conventional diffuser employed with the cycle compressor 40 between the limits of choke and surge and at near peak cycle compressor diffuser recovery. At this time, the variable inlet guide vanes 44 will be set to provide a good incidence angle of the incoming air onto the blades of the impeller defining the cycle compressor 40. As is conventional, the variable inlet guide vane setting for the vanes 44 and the speed of the shaft 46 are set to achieve good efficiency in the cycle compressor.

The shaft 28 is driven at a speed sufficient to maintain good refrigeration power on the ground and sufficiently fast to meet cabin pressure and air flow requirements in flight, and to meet electric power needs. On ground cabin cooling may be achieved by driving the ECS turbo machine 88 through roughly a 4:1 pressure ratio. In flight, the cooling load diminishes rapidly with increasing altitude as ambient temperature rapidly decreases, thereby limiting the need for maximum pressure in the ECS compressor 90 much above the pressure in the cabin 10. Consequently, air conditioning in flight becomes more a function of cabin heating than cabin cooling which is accomplished by modulating heat rejected from the heat exchanger flow path 80 to ram air, or cabin return air in the precooler heat exchanger 82. The temperature sensor 128 operates the valve 124 to modulate the ram air or cabin air flow through the flow path 84 to control the rate of heat rejection.

From the foregoing, it will be seen that a secondary power system made according to the invention eliminates any need for the ducting from main engines for bleed air to operate the environmental control system. Such ducting as is required need only extend between the ECS turbo machine 88 and the turbine machine 18 as well as the cabin 10 and need not be routed through wings or the like. Moreover, the system efficiency is increased by utilizing discharged cabin air as combustion air when the cabin air pressure sufficiently exceeds ambient air pressure. This in turn reduces the amount of fuel burn and cycle compressor work necessary to cause such air to attain a turbine inlet pressure sufficient to drive the turbo machine 18.

Moreover, the system integrates the functions of a conventional auxiliary power unit and an ECS to achieve efficiency and lower capital cost.

While the preferred embodiment of the invention, with various alternative constructions, has been described, it is to be understood that the same is a preferred embodiment and that the invention is applicable to lesser embodiments and may be implemented in forms different than those expressly illustrated or described herein.

What is claimed is:

1. A secondary power integrated cabin energy system for an aircraft, comprising:
   an aircraft cabin;
   a low pressure rotary turbo machine including a rotary load compressor connected by a first shaft to a rotary, low pressure turbine wheel;
   a high pressure rotary turbo machine including a rotary cycle compressor connected by a second shaft to a rotary high pressure turbine wheel;
   a combustor connected to an outlet of said cycle compressor and a source of fuel for combusting fuel to generate combustion gases and direct them to said high pressure turbine wheel to cause rotation of the same;
   an ambient air inlet for said load compressor
   first ducting connecting an outlet of said load compressor to said cabin to provide compressed air to pressurize said cabin;
   second ducting connecting said cabin to an inlet of said cycle compressor; and
   third ducting connecting an outlet of said high pressure turbine wheel to an inlet for said low pressure turbine wheel.

2. The secondary power integrated cabin energy system of claim 1 wherein said shafts are coaxial.

3. The secondary power integrated cabin energy system of claim 2 wherein said first shaft is rotatable within said second shaft.

4. The secondary power integrated cabin energy system of claim 1 further including at least one heat exchanger in said first ducting, said heat exchanger including a coolant flow path in heat exchange relation with said first ducting.

5. The secondary power integrated cabin energy system of claim 4 wherein said coolant flow path includes an inlet connected to receive ambient air.

6. The secondary power integrated cabin energy system of claim 4 wherein said coolant flow path includes an inlet connected to said cabin to receive cabin air.

7. The secondary power integrated cabin energy system of claim 4 wherein said first ducting further includes an environmental control system (ECS) rotary turbo machine including an ECS compressor connected to an ECS turbine wheel;
   said at least one heat exchanger being located in said first ducting between said load compressor outlet and said ECS turbo machine and connected to an inlet of said ECS compressor, and a further heat exchanger having a first flow path interconnecting an outlet of said ECS compressor to an inlet of said ECS turbine wheel, said first ducting further interconnecting an outlet of said ECS turbine wheel to said cabin, said further heat exchanger further including a second flow path for coolant and in heat exchange relation with said first flow path.

8. The secondary power integrated cabin energy system of claim 7 wherein said second flow path has an inlet connected to receive ambient air.

9. The secondary power integrated cabin energy system of claim 7 wherein said second flow path has an inlet connected to said cabin to receive cabin air.

10. The secondary power integrated cabin energy system of claim 1 further including a load to be driven connected to said first shaft.

11. The secondary power integrated cabin energy system of claim 1 further including an ambient air inlet for said cycle compressor.

12. The secondary power integrated cabin energy system of claim 11 including a check valve in said cycle compressor ambient air inlet.

13. The secondary power integrated cabin energy system of claim 1 wherein said inlet of said cycle compressor includes an inlet area varying device at the point of connection of said cycle compressor and said second ducting.

14. The secondary power integrated cabin energy system of claim 13 wherein said inlet area varying device comprises variable inlet guide vanes.

15. A secondary power integrated cabin energy system for an aircraft, comprising:
   a low pressure rotary turbo machine including a rotary load compressor connected by a first shaft to a rotary, low pressure turbine wheel;

a high pressure rotary turbo machine including a rotary cycle compressor connected by a second shaft to a rotary high pressure turbine wheel, said second shaft being concentric about said first shaft;

a combustor connected to an outlet of said cycle compressor and a source of fuel for combusting fuel to generate combustion gases and direct them to said high pressure turbine wheel to cause rotation of the same;

an ambient air inlet for said load compressor a first ducting adapted to connect an outlet of said load compressor to an aircraft cabin to provide compressed air to pressurize the cabin;

second ducting adapted to connect an aircraft cabin to an inlet of said cycle compressor; and third ducting connecting an outlet of said high pressure turbine wheel to an inlet for said low pressure turbine wheel.

16. A secondary power integrated cabin energy system for an aircraft, comprising:

a turbomachine including a rotary compressor connected by a shaft to a rotary turbine wheel and a combustor connected to an outlet of said compressor, to a source of fuel to be combusted to provide gases of combustion and to an inlet to said turbine wheel so that said gases of combustion may drive said turbine wheel to, in turn, drive said compressors;

an inlet to said compressor;

ducting adapted to be connected to an aircraft cabin and to said compressor inlet to provide air from said cabin to said compressor to be compressed thereby and delivered to said combustor to combust fuel therein;

a load to be driven connected to said turbomachine; and a source of air under pressure adapted to be connected to an aircraft cabin, said source of air under pressure including a second rotary compressor coupled by a second shaft to a second rotary turbine wheel.

17. The secondary power integrated cabin energy system of claim 16 wherein said second compressor, second shaft and second turbine wheel form part of said turbo machine, and said shafts are coaxial.

* * * * *